US008681366B2

(12) United States Patent
Ohara

(10) Patent No.: US 8,681,366 B2
(45) Date of Patent: Mar. 25, 2014

(54) IMAGE SCANNER AND IMAGE SCANNING SYSTEM

(71) Applicant: Kiyotaka Ohara, Nagoya (JP)

(72) Inventor: Kiyotaka Ohara, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/027,721

(22) Filed: Sep. 16, 2013

(65) Prior Publication Data
US 2014/0016164 A1    Jan. 16, 2014

Related U.S. Application Data

(63) Continuation of application No. 12/562,185, filed on Sep. 18, 2009, now Pat. No. 8,553,256.

(30) Foreign Application Priority Data

Sep. 26, 2008 (JP) .................................. 2008-248589

(51) Int. Cl.
*G06F 3/12* (2006.01)

(52) U.S. Cl.
USPC ........ 358/1.15; 358/1.13; 358/1.16; 358/400; 358/501; 358/434; 358/468; 358/438; 358/405; 358/402; 382/305; 382/306

(58) Field of Classification Search
None
See application file for complete search history.

(56) References Cited

U.S. PATENT DOCUMENTS

| 5,764,866 | A | 6/1998 | Maniwa |
| 6,388,772 | B1 | 5/2002 | Williams |
| 6,411,393 | B1 | 6/2002 | Wakasugi |
| 6,762,853 | B1 | 7/2004 | Takagi et al. |
| 7,202,962 | B2 | 4/2007 | Roosen et al. |

(Continued)

FOREIGN PATENT DOCUMENTS

| CN | 101068301 A | 11/2007 |
| EP | 1962486 A2 | 8/2008 |

(Continued)

OTHER PUBLICATIONS

Non-Final Office Action issued in U.S. Appl. No. 12/562,185, dated Jan. 17, 2013.

(Continued)

*Primary Examiner* — Hilina K Demeter
(74) *Attorney, Agent, or Firm* — Banner & Witcoff, Ltd.

(57) ABSTRACT

An image scanning system comprising an image scanner and a terminal, wherein the image scanner comprises an image storing unit to store the image data; a terminal designation unit to designate the terminal as a transmission target; a terminal storing unit to record correspondence data to associate the image data with the terminal; an information notification unit to transmit a notification of information concerning image data to the designated terminal; a request receiving unit to receive a request for image data; and an image transmission unit to transmit the image data associated with the designated terminal for which the request has been received, and the terminal comprises: an indication unit to make an indication in response to receipt of the notification; and a request transmission unit to transmit the request to the image scanner when a user operation for requesting image data is received.

6 Claims, 8 Drawing Sheets

(56) References Cited

U.S. PATENT DOCUMENTS

| | | |
|---|---|---|
| 7,730,191 B2 | 6/2010 | Otsuka et al. |
| 7,760,380 B2 | 7/2010 | Suwabe |
| 7,865,714 B2 | 1/2011 | Koue et al. |
| 7,895,306 B2 | 2/2011 | Bobo, II |
| 7,990,580 B2 | 8/2011 | Motoyoshi |
| 8,014,040 B2 | 9/2011 | Rosenfeld et al. |
| 2002/0107983 A1* | 8/2002 | Iyoki .................... 709/245 |
| 2003/0184828 A1 | 10/2003 | Morisaki |
| 2004/0093386 A1 | 5/2004 | Sakiyama et al. |
| 2004/0125396 A1 | 7/2004 | Burke |
| 2005/0046890 A1 | 3/2005 | Shudo |
| 2005/0141026 A1 | 6/2005 | Fujino |
| 2005/0141041 A1* | 6/2005 | Jung .................... 358/401 |
| 2006/0271675 A1* | 11/2006 | Wakazono et al. ......... 709/224 |
| 2007/0156705 A1 | 7/2007 | Tsuya |
| 2007/0171485 A1 | 7/2007 | Yachida |
| 2007/0177822 A1 | 8/2007 | Uno |
| 2007/0201102 A1* | 8/2007 | Hull et al. .............. 358/400 |
| 2007/0208931 A1 | 9/2007 | Koue et al. |
| 2007/0237321 A1 | 10/2007 | Bloebaum et al. |
| 2007/0239845 A1 | 10/2007 | Sueshige |
| 2007/0279684 A1 | 12/2007 | Yoshihama |
| 2008/0018952 A1* | 1/2008 | Du et al. ............... 358/468 |
| 2008/0043282 A1 | 2/2008 | Tsuboi |
| 2008/0095339 A1 | 4/2008 | Elliott et al. |
| 2008/0170271 A1 | 7/2008 | Lee |
| 2009/0015862 A1 | 1/2009 | Kim |
| 2009/0059271 A1 | 3/2009 | Henry et al. |
| 2009/0225349 A1 | 9/2009 | Hirai |
| 2010/0279662 A1 | 11/2010 | Kuusinen et al. |
| 2012/0086981 A1 | 4/2012 | Ohishi et al. |

FOREIGN PATENT DOCUMENTS

| | | |
|---|---|---|
| JP | 11-103367 | 4/1999 |
| JP | 11-215331 | 8/1999 |
| JP | 2001352452 A | 12/2001 |
| JP | 2005192022 A | 7/2005 |
| JP | 2006050535 A | 2/2006 |
| JP | 2006-333388 A | 12/2006 |
| JP | 2007195005 A | 8/2007 |
| JP | 2007-300553 A | 11/2007 |

OTHER PUBLICATIONS

Notice of Allowance issued in corresponding U.S. Appl. No. 12/562,185 mailed May 24, 2013.

Notification of First Office Action for Chinese Application No. 200910177641.3 mailed Dec. 9, 2010.

Notification of Reasons for Rejection received for corresponding Japanese Application No. 2008-248589 mailed on Sep. 7, 2010.

Examination Report issued in the corresponding European Application No. 09252182.2 dated Aug. 13, 2010.

European Search Report for Application No. 09252182.2-1522 dated Nov. 24, 2009.

\* cited by examiner

■ SCANNER SIDE LIST

PC LIST

| PC NAME | REGISTRATION TIME |
|---|---|
| PC NAME 1 | 2008/08/20 20:35 |
| PC NAME 2 | 2008/08/20 20:38 |
| PC NAME 3 | 2008/08/20 20:37 |

SCAN LIST

| SCAN ID | REGISTRATION TIME | PC NAME | DATA POINTER |
|---|---|---|---|
| 45735683 | 2008/08/20 18:01 | PC NAME 1 | 0x450068 |
| 5673563254 | 2008/08/20 20:33 | PC NAME 3 | 0x500870 |

■ PC SIDE LIST

SCAN COMPLETION NOTIFICATION LIST

| SCAN ID | SCANNER NAME | REGISTRATION TIME |
|---|---|---|
| 45735683 | SCANNER 1 | 2008/08/20 18:01 |
| 9878542 | SCANNER 3 | 2008/08/20 18:30 |

FIG. 3

■ SCANNER SIDE OUTPUT  NOTIFICATION/COMMAND FORMAT

■ PC SIDE OUTPUT  NOTIFICATION/COMMAND FORMAT

LADDER CHART IN STANDBY STATE

LADDER CHART AT TIME OF EXPIRATION

IMAGE SCANNER AND IMAGE SCANNING SYSTEM

CROSS-REFERENCE TO RELATED APPLICATION

This application is a continuation of U.S. patent application Ser. No. 12/562,185 filed Sep. 18, 2009, which claims priority under 35 U.S.C. §119 from Japanese Patent Application No. 2008-248589, filed on Sep. 26, 2008. The entire subject matter of the application is incorporated herein by reference.

BACKGROUND

1. Technical Field

Aspects of the present invention relate to an image scanner and an image scanning system for generating image data based on an image formed on a medium such as a sheet of paper.

2. Related Art

Image scanning systems in which scanned image data is transmitted and received between an MFP (Multifunction Peripheral) and a PC (Personal Computer) have been widely used. In such a conventional image scanning system, a so-called push-scan function of transmitting scanned image data generated on the MFP to the PC through a LAN in response to a command for direct-scanning inputted to the MFP by a user is employed.

SUMMARY

When the push-scan is performed, a user needs to place a document to be scanned on the MFP and to operate the MFP to input a start command for the push-scan. Therefore, in this case, the user is not at the place around the PC which receives the scanned image data. However, in the conventional image scanning system, the PC which has received the scanned image data automatically starts an application to display an image based on the scanned image data.

Therefore, a possibility that an outsider might sneak a look at the displayed image on a display of the PC arises. As a result, important information may leak to the outsider.

Aspects of the present invention are advantageous in that at least one of an image scanner and an image scanning system configured to prevent a displayed image obtained by a push-scan function from being looked by an outsider and thereby to prevent information from being leaked to the outsider is provided.

According to an aspect of the invention, there is provided an image scanning system, comprising: an image scanner that scans an image in accordance with a command directly inputted by a user and generates image data based on the scanned image; and a terminal device that displays an image corresponding to the image data generated by the image scanner. The image scanner comprises: an image storing unit configured to store the generated image data; a terminal designation unit configured to allow the user to designate the terminal device as a transmission target of the image data; a terminal storing unit configured to record correspondence data in which the image data is associated with the designated terminal device; an information notification unit configured to transmit a notification of information concerning the image data to the designated terminal device; a request receiving unit configured to receive a request for image data from the designated terminal device; and an image transmission unit configured to transmit the image data which has been stored in the image storing unit and which is associated, by the correspondence data, with the designated terminal device for which the request has been received through the request receiving unit, to the designated terminal device, in response to reception of the request through the request receiving unit. The terminal device comprising: an indication unit configured to make an indication to the user in response receipt of the notification from the information notification unit; and a request transmission unit configured to transmit the request for image data to the image scanner in response to reception of a user operation for requesting the image data conducted in response to the indication by the indication unit.

According to another aspect of the invention, there is provided an image scanner, comprising: a scan unit configured to scan an image in accordance with a command directly inputted by a use and to generate image data based on the scanned image; an image storing unit configured to store the generated image data; a terminal designation unit configured to allow a user to designate a terminal device as a transmission target of the image data; a terminal storing unit configured to record correspondence data in which the image data is associated with the designated terminal device; an information notification unit configured to transmit a notification of information concerning the image data to the designated terminal device; a request receiving unit configured to receive a request for image data from the designated terminal device; and an image transmission unit configured to transmit the image data which has been stored in the image storing unit and which is associated, by the correspondence data, with the designated terminal device for which the request has been received through the request receiving unit; to the designated terminal device, in response to reception of the request through the request receiving unit.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

BRIEF DESCRIPTION OF THE ACCOMPANYING DRAWINGS

FIG. 3 illustrates examples of a PC list, a scan list and a scan completion notification list.

DETAILED DESCRIPTION

Hereafter, an embodiment according to the invention will be described with reference to the accompanying drawings.

Figure 1:
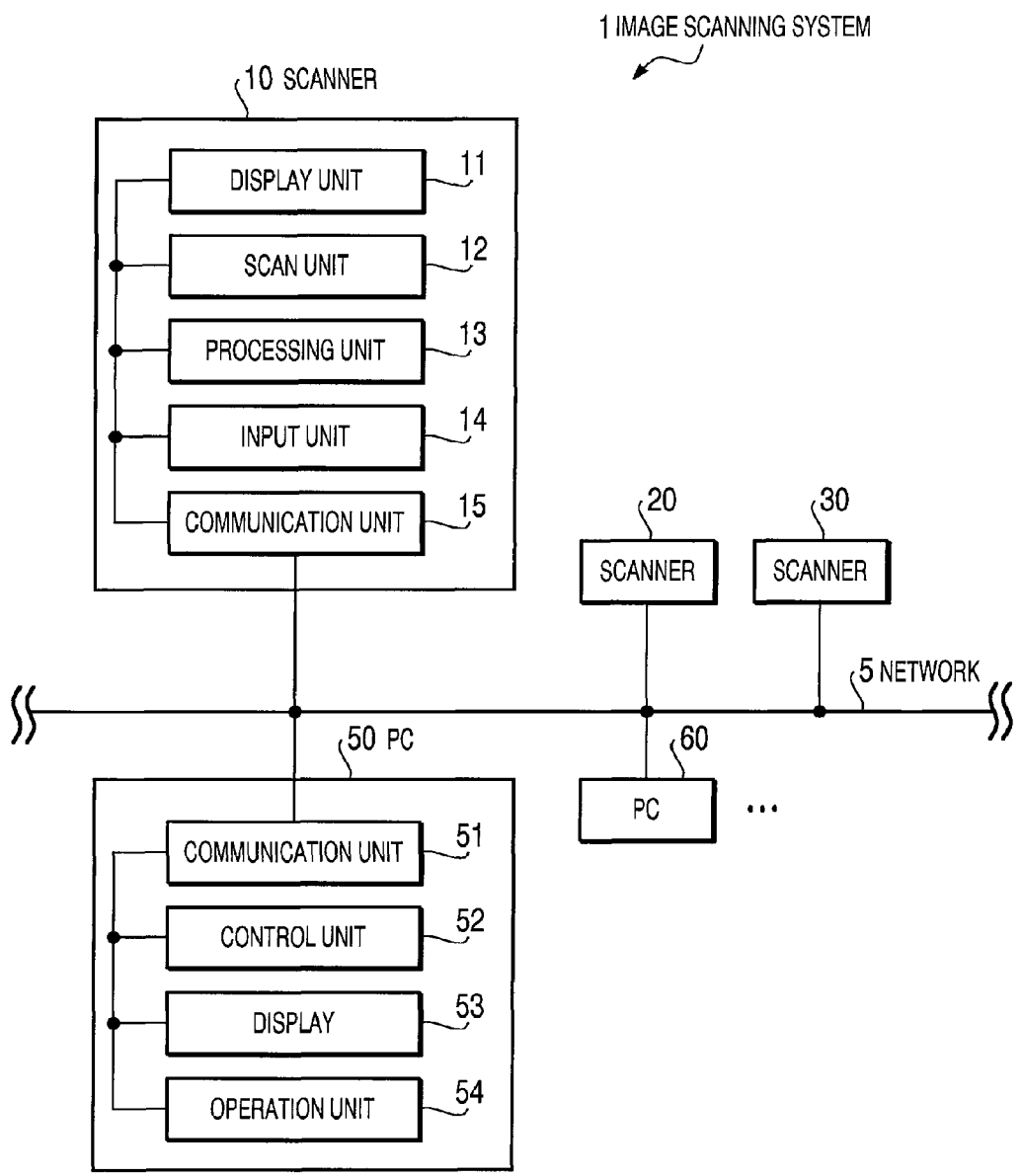
FIG. 1 is a block diagram of an image scanning system according to an embodiment.

As shown in FIG. 1, an image scanning system 1 includes a plurality of scanners 10, and 30, and a plurality of personal computers 50 and 60 which are connected to each other via a network 5.

Each of the scanners 10, 20 and 30 includes a display unit 11, a scan unit 12, a processing unit 13, an input unit 14 and a communication unit 15. Since the scanners 10, 20 and 30 have the same configuration, in FIG. 1 the detailed configuration is illustrated only for the scanner 10. In the following, explanations of the detailed configuration of the scanner 10 are provided, and explanations of the detailed configuration for the scanners 20 and 30 will not be repeated for the sake of simplicity.

The display unit 11 is, for example, a LCD (Liquid Crystal Display), and is configured to display an image based on an image signal from the processing unit 13. The scan unit 12 has a scanning mechanism which scans an image formed on a document placed on the scanner 10. The input unit 14 is a user interface having a plurality buttons or a touch panel. When a scan command is inputted by a user through the input unit 14, the scan unit 12 is activated in accordance with instructions from the processing unit 13.

The communication unit 15 is configured as a communication interface which communicates with an external device (e.g., the PCs 50 and 60) via the network 5.

The processing unit 13 is implemented by a microcomputer chip in which a CPU, a ROM and a RAM are embedded. In response to a command inputted from the input unit 14 or the communication unit 15, the processing unit 13 executes a process in accordance with a program stored in the ROM embedded therein. Further, the processing unit 13 includes a non-volatile memory (e.g., a flash memory).

Each of the PCs 50 and 60 includes a communication unit 51, a control unit 52, a display 53, and an operation unit 54. Since the PCs 50 and 60 have the same configuration, in FIG. 1 the detailed configuration is illustrated only for the PC 50. In the following, explanations of the detailed configuration of the PC 50 are provided, and explanations of the detailed configuration for the PC 60 will not be repeated for the sake of simplicity.

The communication unit 51 is configured as a communication interface which communicates with an external device (e.g., the scanners 10, 20 and 30) via the network 5. The display 53 is, for example, an LCD (Liquid Crystal Display) and is configured to display an image based on an image signal from the control unit 52. The operation unit 54 is a user interface, such as a keyboard and a mouse.

The control unit 52 is implemented by a microcomputer chip in which a CPU, a ROM and a RAM are embedded. In response to a command inputted from the operation unit 54 or the communication unit 51, the control unit 52 executes a process in accordance with a program stored in the ROM embedded therein. Further, the control unit 52 includes a non-volatile memory (e.g., an HDD (hard disk drive)).

The image scanning system 1 has a so-called push-scan function where, in response to a command for direct-scanning inputted by the user to one of the scanners 10, 20 and 30, scanned image data (hereafter, simply referred to as scanned data) is generated on the scanner to which the command is inputted, and the scanned image data is transmitted to the PC (50 or 60).

Hereafter, processes for achieving the push-scan function are explained with reference to drawings from FIG. 2.

Figure 2:
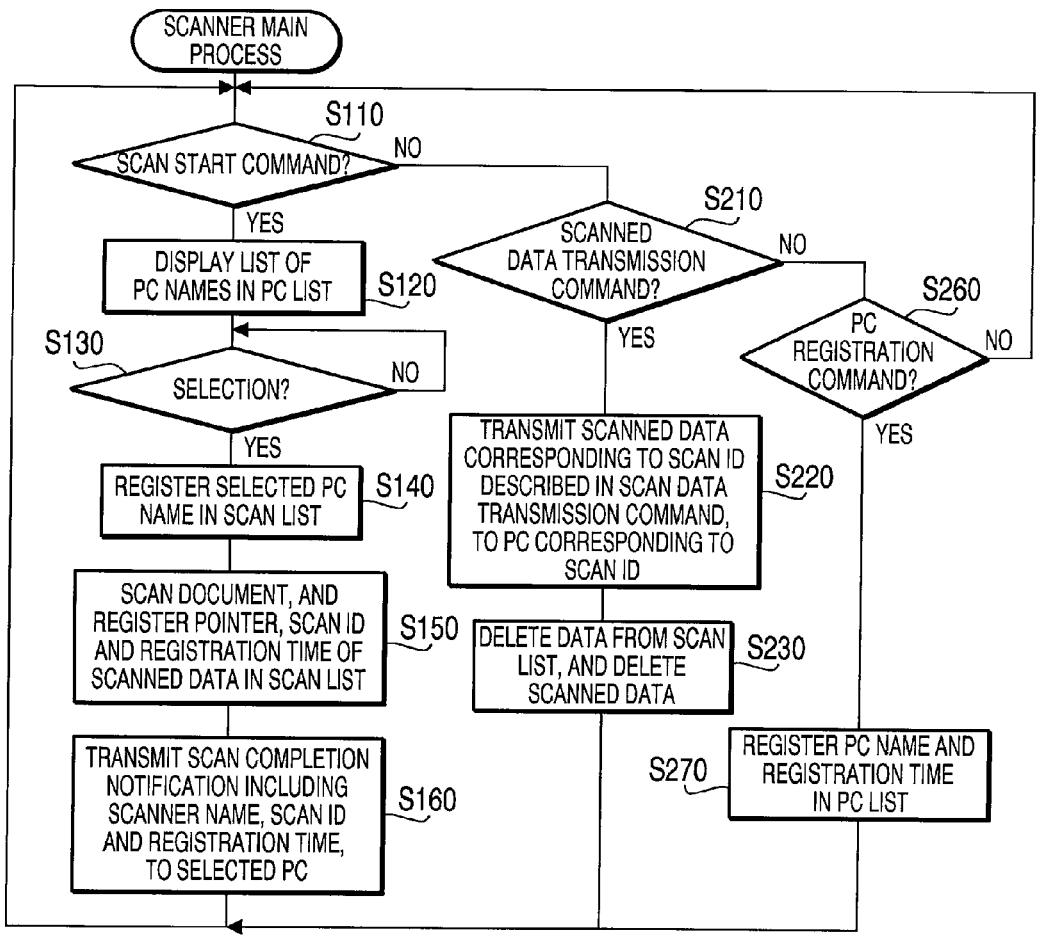
FIG. 2 is a flowchart illustrating a scanner main process.

A scanner main process shown in FIG. 2 is started, for example, when power of the scanner (10, 20 or 30) is turned ON. The scanner main process is executed under control of the processing unit 13 of the scanner. As shown in FIG. 2, the processing unit 13 judges whether a command is inputted through the input unit 14 or the communication unit 15 (steps S110, S210 and S260). The control unit 13 waits until one of a scan start command, a scan data transmission command and a PC registration command is inputted (steps S110, S210 and S260).

When the scan start command is inputted (S110: YES), the processing unit 13 displays a list of PC names included in a PC list at the present moment (step S120) to allow a user to select a PC name of a transmission target to which scanned data is to be transmitted. As shown at the upper portion in FIG. 3, the PC list has a data structure in which a PC name and a registration time (i.e., a time when a PC registration command is accepted) are associated with each other. Data is added to the PC list in step S270 which is explained later.

Then, in step S130, the processing unit 13 judges whether at least one of the PC names is selected from the list (step S130 which functions as a terminal designation unit). The processing unit 13 waits until at least one of the PC names is selected (S130: NO). When one of the PC names is selected (S130: YES), the processing unit 13 registers the selected PC name in a scan list (correspondence data) (step S140 which functions as a terminal storing unit).

As shown in the middle portion in FIG. 3, the scan list has a data structure in which a scan ID for identifying image data, a registration time of the image data, a PC name and a data pointer indicating an address in the RAM storing the image data are associated with each other. In step S140, a corresponding filed of the scan list is filled with the PC name.

Next, the processing unit 13 activates the scan unit 12 to scan a document, and stores a data pointer to the generated image data in the RAM of the processing unit 13, the scan ID and the registration time in the scan list (step S150 which functions as an image storing unit). That is, in step S150, fields in the scan list other than the filed for the PC name are filled with data. The scan ID may be a particular character string for identifying the scanned data. Therefore, for example, the scan ID may be generated automatically using a random number generated in accordance with the registration time and a MAC address of the scanner (10, 20, or 30).

In step S160, a scan completion notification including information concerning the image data, such as the scanner's own name (i.e., the name of one of the scanners 10, 20 and 30), the scan ID and the registration time, is transmitted to the PC selected in step S130 (step S160 which functions as an information notification unit). Then, the scanner main process is repeated from the beginning The PC (50 or 60) which has received the scan completion notification registers the data included in the scan completion notification into a scan completion notification list, and displays an icon indicating that the notification is received (see steps S420 and S430 in a PC main process which is explained later).

When the processing unit 13 judges that the scan data transmission command is accepted (S110: NO and S210: YES), the processing unit 13 reads the scanned data corresponding to the scan ID included in the scan data transmission command, by referring to the scan list, and transmits the scanned data to the PC (50 or 60) which is a source of the scan data transmission command (step S220). In this case, step S210 functions as a request receiving unit, and step S220 functions as an image transmission unit.

Figure 4:
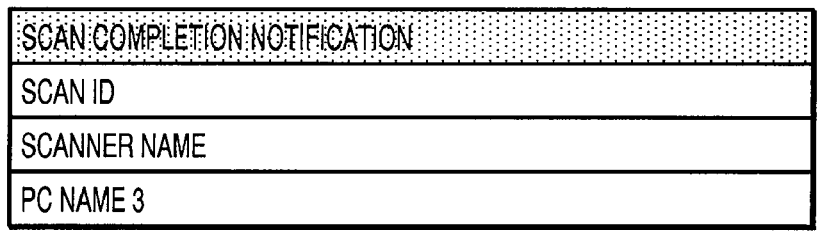
FIG. 4 illustrates examples of a scan completion notification, an expiration notification, a PC registration command, and a scan data transmission command.
Figure 4:
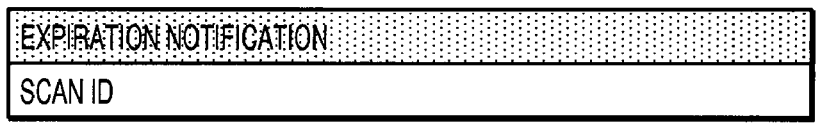
Figure 4:
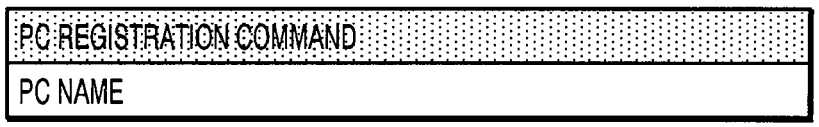
Figure 4:

As shown in the lower portion in FIG. 4, the scan data transmission command includes information of the scan ID. In step S220, the processing unit 13 may judge whether the PC name described in the scan list matches the PC name of the source of the scan data transmission command, and 13 may transmit the scanned data only when the PC name described in the scan list matches the PC name of the source of the scan data transmission command. On the other hand, when the PC name described in the scan list does not match the PC name of the source of the scan data transmission command, the processing unit 13 may not transmit the scanned data to the PC of the source of the scan data transmission command.

After step S220 is processed (i.e., after the scanned data is transmitted), the processing unit 13 deletes data relating to the scanned data which has been transmitted, from the scan list, and deletes the scanned data itself (step S230). Then, the scanner main process is repeated from the beginning.

If the PC registration command has been received when the scanner main process is started (S110: NO, S210: NO and S260: YES), the processing unit 13 registers the PC name included in the PC registration command into the PC list while adding a current time (i.e., a registration time) to the PC name (step S270). Then, the scanner main process is repeated from the beginning.

Figure 5A:
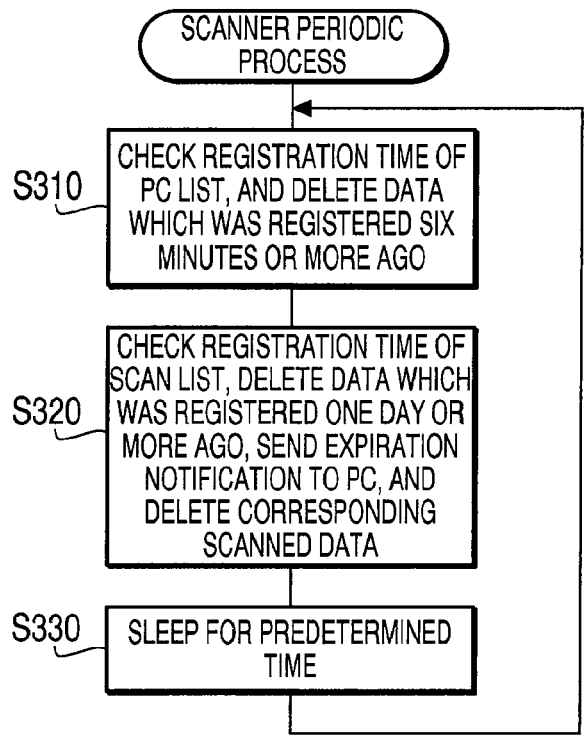
FIG. 5A is a flowchart illustrating a scanner periodic process.
Figure 5B:
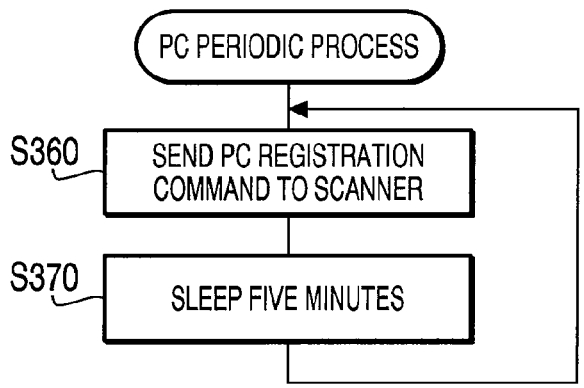
FIG. 5B is a flowchart illustrating a PC periodic process.

Hereafter, processes where the scanner (10, 20 or 30) identifies the PC (50 or 60) in an operating state with reference to FIGS. 5A and 5B. A scanner periodic process shown in FIG. 5A is executed under control of the processing unit 13 of the scanner. The scanner periodic process is started, for example, when the scanner is turned ON. A PC periodic process shown in FIG. 5B is executed under control of the control unit 52 of the PC. The PC periodic process is started, for example, when the PC is turned ON.

As shown in FIG. 5A, when the scanner periodic process is started, the processing unit 13 refers to the PC list, and deletes the data which was registered 6 minutes or more ago (step S310 which functions as a first deletion unit). Then, the processing unit 13 refers to the scan list to delete the data for which one day or more has elapsed from the registration time, and then transmits an expiration notification indicating that the information concerning the image data is to be deleted, to the PC (step S320 which functions as a deletion notification unit).

At this time, the processing unit 13 deletes the scanned data corresponding to the data deleted from the scan list. As shown at the middle portion in FIG. 4, the expiration notification includes a scan ID. Then, the processing unit 13 moves the scanner into a sleeping state of sleeping for a predetermined time period (e.g., 5 minutes). After the predetermined time period has elapsed, the scanner periodic process is repeated from the beginning.

As shown in FIG. 5B, when the PC periodic process is started, the control unit 52 of the PC (10, 20 or 30) transmits the PC registration command which is data containing the PC name, to the scanner (10, 20 or 30) of which scanner name has been registered (step S360). Then, the control unit 52 moves the PC to a sleeping state of sleeping a predetermined time period (e.g., 5 minutes) (step S370). After the predetermined time period has elapsed, the PC periodic process is repeated from the beginning.

The scanner (10, 20 or 30) which has received the PC registration request through the PC periodic process operates to write data into the PC list in which the PC name is associated with the registration time (see steps S260 and S270 in the scanner main process). The PC list is registered, for example, in the RAM.

Through the above described PC periodic process and scanner periodic process, the scanner (10, 20, or 30) becomes able to identify the PC in an operating state.

Figure 6:
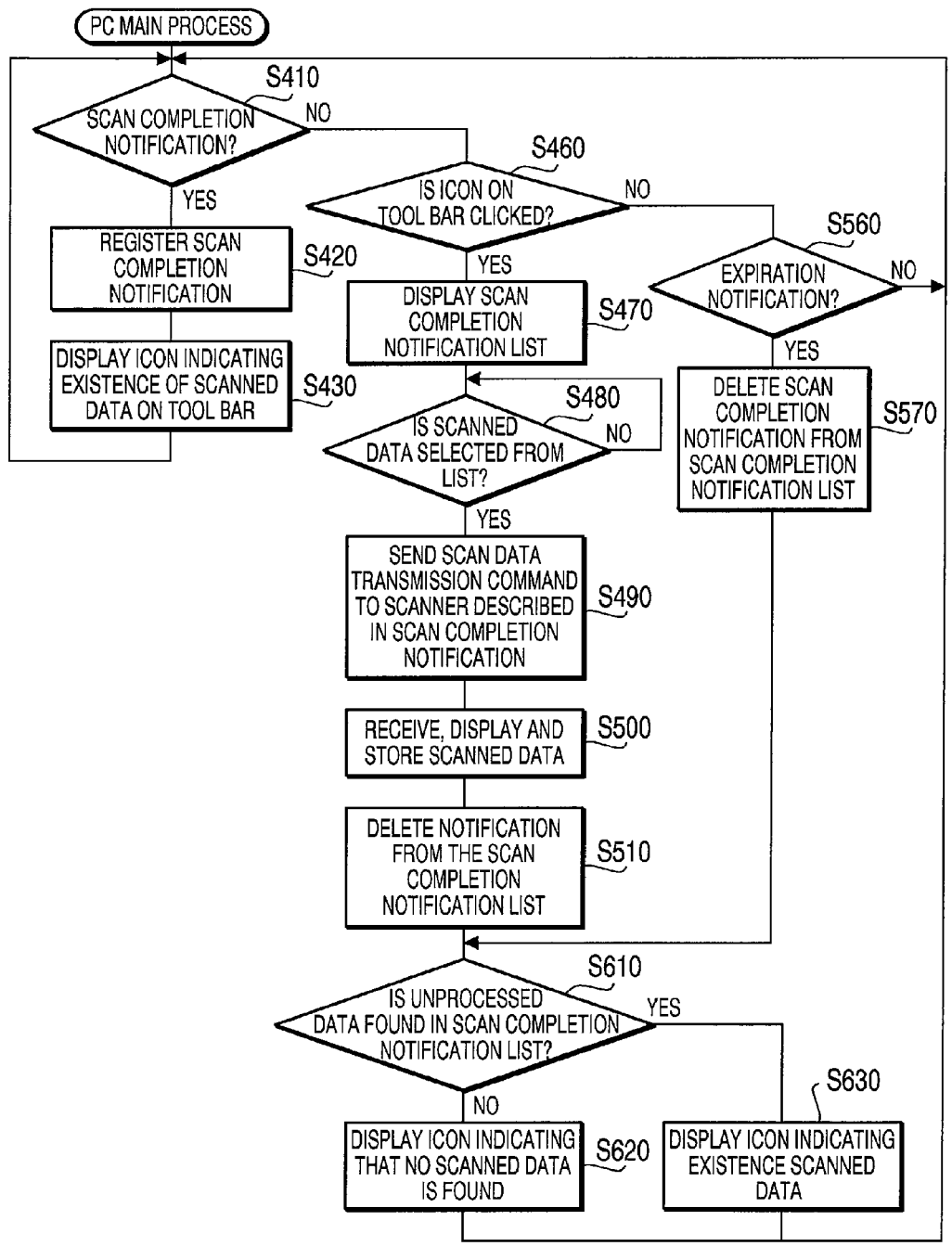
FIG. 6 is a flowchart illustrating a PC main process.

Hereafter, the PC main process shown in FIG. 6 is explained. The PC main process is executed under control of the control unit 52 of the PC (50 or 60). The PC main process is started when the PC is turned ON.

When the PC main process is started, the control unit 52 judges whether a command is inputted to the PC through the communication unit 51 or the operation unit 54 (steps S410, S460 and S560). If no command is received, the control unit 52 waits until a command is received (S410: NO, S460: NO and S560: NO).

If the control unit 52 of the PC (50 or 60) has received the scan completion notification from the scanner (10, 20 or 30) through the communication unit 51 (S410: YES), the control unit 52 registers the scan completion notification in the scan completion notification list (step S420).

As shown at the lower portion in FIG. 3, the scan completion notification list includes the scan ID, the scanner name and a registration time which is a time of registration in the scan completion notification list. That is, in the scan completion notification list, the registration time is related to the scan ID and the scanner name which are contained in the scan completion notification. The scan completion notification list is stored, for example, in the RAM or HDD in the control unit 52.

Next, the control unit 52 of the PC displays an icon (e.g., an image representing the scanner and data) indicating existence of the scanned data, on a tool bar on the display 53 (step S430 which functions as a notification unit). Then, the scanner periodic process is repeated from the beginning.

If the user has clicked the icon on the tool bar through the operation unit 54 when the PC main process is started (S410: NO and S460: YES), the control unit 52 reads the scan completion notification list, and displays the list of the scan completion notification list (step S470). Then, the control unit 52 judges whether the user has selected at least one of the scanned data from the list through the operation unit 54 (step S480). It should be noted that if the scan completion notification list includes only one piece of scanned data, the control unit 52 may judge that the scanned data has selected by the user and may skip steps S470 and S480.

If the scanned data has not selected (S480: NO), the control unit 52 waits until the scanned data is selected. When the scanned data has selected (S480: YES), the control unit 52 transmits the scan data transmission command to the scanner (10, 20 or 30) corresponding to the scanner name described in the scan completion notification (step S490 which functions as a request transmission unit).

The control unit 52 received the scanned data transmitted from the scanner in response to the request (i.e. the command), displays an image corresponding to the received scanned data, and stores the scanned data, for example, in the HDD of the control unit 52 (step S500). Then, the control unit 52 deletes the data corresponding to the received scanned data from the scan completion notification list (step S510).

Next, the control unit 52 judges whether an unprocessed data exists in the scan completion notification list (i.e., judges whether an item for which the scanned data has not been received exists in the scan completion notification list) (step S610). If an unprocessed data is not found in the scan completion notification list (S610: NO), the control unit 52 displays an icon indicating that no scanned data exists on the tool bar on the display 53 (step S620). If an unprocessed data is found in the scan completion notification list (S610: YES), the control unit 52 displays an icon indicating that the scanned data exists, on the tool bar on the display 53 (step S630). Then, the PC main process terminates.

If the control unit 52 has received the expiration notification when the PC main process is started (S560: YES), the control unit 52 deletes the data item corresponding to the scan ID included in the expiration notification (step S570 which functions as a second deletion unit). Then, the steps from S610 are executed.

Hereafter, data exchanged between the scanner (10, 20 or 30) and the PC (50 or 60) is explained with reference to FIGS. 7A, 7B and 8.

Figure 7A:
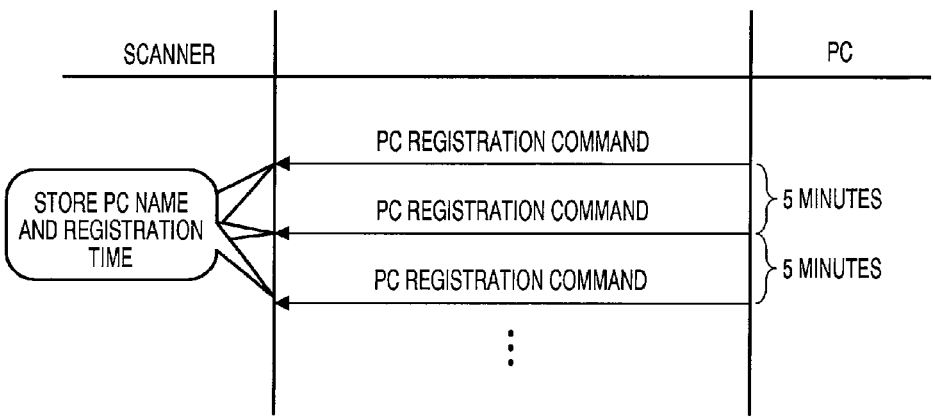
FIG. 7A is a ladder chart illustrating data exchange in a standby state.

As shown in FIG. 7A, in a standby state, the PC (50 or 60) transmits periodically the PC registration command to the scanner (10, 20 or 30) to notify the scanner that the PC is in an operating state (step S360). Each time the scanner receives the registration request, the scanner registers the PC name and the registration time in the PC list (step S310).

Figure 7B:
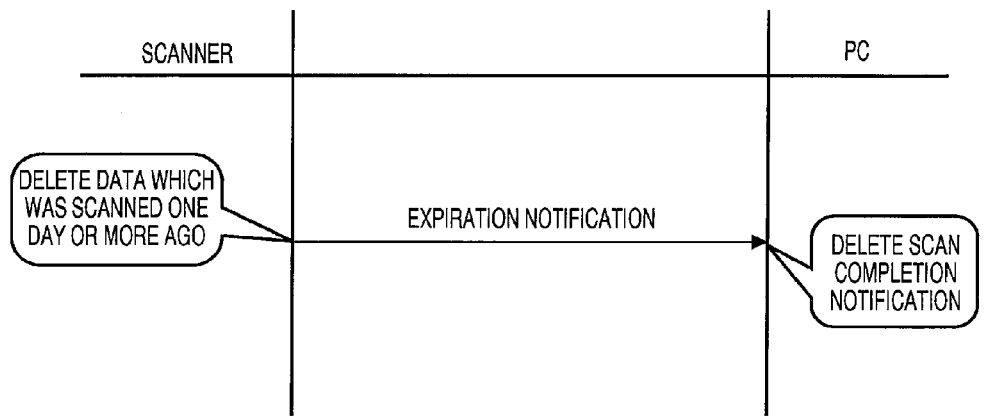
FIG. 7B is a ladder chart illustrating data exchange at the time of expiration.

As shown in FIG. 7B, at the time of expiration when the scanned data stored in the scanner should be deleted, an expiration notification is transmitted from the scanner to the PC registered in the scan list (S320). The PC which has received the expiration notification deletes the scan completion notification (S510).

Figure 8:
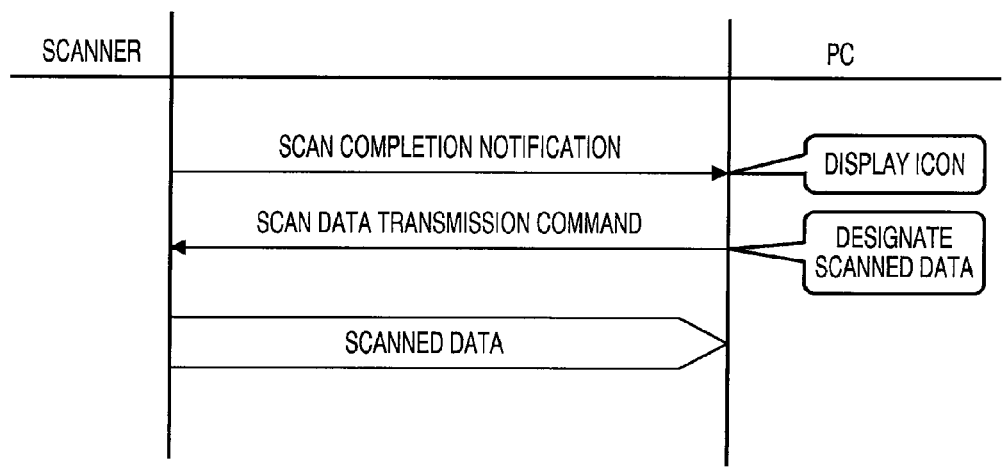
FIG. 8 is a ladder chart illustrating data exchange at the time of scanning.

As shown in FIG. 8, at the time of scanning, the scan completion notification is transmitted from the scanner to the PC prior to sending of the scanned data (S160). The PC which has received the scan completion notification registers the data of the scan completion notification in the scan completion notification list (S420). Then, the PC displays the icon indicating receipt of the notification (S430). Subsequently, when the PC receives designation of the scanned data (S480), the PC transmits the scan data transmission command to the scanner (S490). The scanner whish has received the scan data transmission command transmits the scanned data to the PC (S220).

Hereafter, advantages achieved by the above described embodiment are described. In the above described image scanning system 1, the scanner (10, 20 or 30) allows the user to designate the PC (50 or 60) to which the image data is to be transmitted, and stores the generated scanned data, for example, in the RAM in the processing unit 13. Then, the scanner registers the scan list in which the scan data is related to the PC, in the RAM of the processing unit 13, and transmits the information concerning the scanned data to the PC.

Then, in response to receipt of the notification (i.e., the scan completion notification) from the scanner (10, 20 or 30), the PC notifies the user of receipt of the notification. When the user operation for requesting the scanned data is received, the PC transmits the data request to the scanner.

In response to receipt of the data request from the scanner, the scanner transmits the scanned data stored in the RAM of the processing unit 13, to the PC.

That is, in the image scanning system 1 of the embodiment, the scanner (10, 20 or 30) does not transmit the scanned data to the PC (50 or 60) until the data request based on the user operation on the PC is received. Therefore, according to the embodiment, it becomes possible to prevent information from leaking due to the fact that an outsider sneaks a look at the displayed image corresponding to the scanned data.

In the image scanning system 1, in response to receipt of the scan completion notification from the scanner, the control unit 52 of the PC (50 or 60) displays, on the display 53, an image (e.g., an icon and a list of scanned data) indicating that the notification has been received. In this case, when the user selects a notification image corresponding to the notification on the display 53, the PC judges that the user operation for requesting the scanned data from the user is accepted, and transmits a request to the scanner. Therefore, according to the image scanning system 1, the user is able to obtain the scanned data from the scanner by only selecting the notification image displayed on the PC.

In the image scanning system 1, the scanner deletes the scanned data when a predetermined time period has elapsed since the scanned data has been generated, and transmits a deletion notification indicating deletion of the scanned data, to the PC (50 or 60) corresponding to the deleted scanned data.

In the PC (50 or 60), information concerning the scanned data is stored. When the notification indicating deletion of the scanned data is received from the scanner (10, 20 or 30), the PC deletes the information concerning the scanned data corresponding to the received deletion notification. Furthermore, the PC notifies the user of information indicating existence of the scanned data in response to a fact that at least a piece of scanned data is stored in the PC.

According to the image scanning system 1, it is possible to prevent the scanned data from remaining in the scanner (10, 20 or 30) for a long period of time. Furthermore, it is possible to delete the information concerning the scanned data on the PC (50 or 60) when the scanner (10, 20 or 30) deletes the scanned data. At this time, if at least a piece of scanned data remains on the PC, the PC is able to notify the user of existence of the scanned data.

Although the present invention has been described in considerable detail with reference to certain preferred embodiments thereof, other embodiments are possible.

In the above described embodiment, the control unit 52 of the PC (50 or 60) provides the same indication (i.e., the icon indicating existence of the scanned data) regardless of times that the notification indicating existence of the scanned data is received. However, the PC may be configured to display, on the display 53, notification images, the number of which is equal to the times that the notification is received such that the notification images are associated with respective scan IDs and are selectable on the display 53. In this case, when one of the notification images is selected on the display 53 of the PC, the PC judges that a request for the scanned is inputted by the user, and transmits the data request containing the scan ID corresponding to the selected notification image, to the scanner (10, 20 or 30). It should be noted that in this case the same advantages as those of the above described embodiment can also be achieved.

The scanner may be configured as a multifunction peripheral having multiple functions including a printer function and a facsimile function.

What is claimed is:

1. An image scanner, comprising:
    a scanning unit configured to scan one or more images on a first document and a second document;
    an input unit;
    memory storing computer-readable instructions; and
    a control unit configured to execute the computer-readable instructions, the computer-readable instructions, when executed, causing the image scanner to:
        receive input of destination information through the input unit;
        receive, through the input unit, a first scan start command to start scanning an image of the first document and to generate first scan image data which is to be transmitted to a terminal device identified by destination information associated with the first scan start command;
        generate the first scan image data based on the first document scanned by the scanning unit in response to the first scan start command;
        receive, through the input unit, a second scan start command to start scanning one of: the image of the first document and an image of the second document and to generate second scan image data which is to be transmitted to a terminal device identified by destination information associated with the second scan start command;

generate the second scan image data based on the one of the first document and the second document scanned by the scanning unit in response to the second scan start command;

store the first scan image data and the second scan image data;

transmit a first notification to the terminal device identified by the destination information associated with the first scan start command, the first notification including information related to the stored first scan image data;

transmit a second notification to the terminal device identified by the destination information associated with the second scan start command, the second notification including information related to the stored second scan image data;

receive a request for scan image data from the terminal device to which the first notification was transmitted or the terminal device to which the second notification was transmitted;

transmit the first scan image data to the terminal device to which the first notification was transmitted if the request for the first scan image data is received from the terminal device to which the first notification was transmitted; and transmit the second scan image data to the terminal device to which the second notification was transmitted if the request for the second scan image data is received from the terminal device to which the second notification was transmitted.

2. The image scanner according to claim 1, wherein the first notification and the second notification respectively include device information identifying the scanning device.

3. The image scanner according to claim 1, wherein the first notification and the second notification respectively include time information indicative of a time at which the respective scan image data is stored by the scanner.

4. The image scanner according to claim 3, wherein the computer-readable instructions, when executed, further cause the image scanner to:

store first time information in association with the first scan image data; and remove the first scan image data if a predetermined period has passed from a time indicated by the first time information associated with the first scan image data.

5. The image scanner according to claim 4, wherein the computer-readable instructions, when executed, further cause the image scanner to notify removal of the first scan image data to the terminal device to which the first notification was transmitted.

6. The image scanner according to claim 1, wherein the computer-readable instructions, when executed, further cause the image scanner to remove the stored first scan image data after the first scan image data is transmitted to the terminal device to which the first notification was transmitted.

* * * * *